United States Patent
Briggs et al.

(10) Patent No.: US 9,691,045 B1
(45) Date of Patent: *Jun. 27, 2017

(54) ROADSIDE ASSISTANCE MANAGEMENT

(71) Applicant: Allstate Insurance Company, Northbrook, IL (US)

(72) Inventors: Ryan M. Briggs, Glen Ellyn, IL (US); Eva Smith, Boulder, CO (US); Priya Shah, Chicago, IL (US); Thomas J. Wilson, Chicago, IL (US); William C. Jordan, Beverly Hills, MI (US); Lawrence David Burns, Franklin, MI (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,182

(22) Filed: Jan. 29, 2016

Related U.S. Application Data

(63) Continuation of application No. 14/705,387, filed on May 6, 2015, now Pat. No. 9,286,587, which is a (Continued)

(51) Int. Cl.
*G06F 19/00* (2011.01)
*G06Q 10/06* (2012.01)
(Continued)

(52) U.S. Cl.
CPC ..... *G06Q 10/06315* (2013.01); *G06Q 10/067* (2013.01); *G06Q 10/10* (2013.01); *G06Q 30/02* (2013.01)

(58) Field of Classification Search
CPC ........... G06Q 10/06315; G06Q 10/067; G06Q 10/10; G06Q 30/02; G06Q 30/0601;
(Continued)

(56) References Cited

U.S. PATENT DOCUMENTS

| 5,848,373 A | 12/1998 | DeLorme et al. |
| 6,347,094 B1 | 2/2002 | Gopalakrishnan |

(Continued)

FOREIGN PATENT DOCUMENTS

| EP | 2553635 A1 | 2/2013 |
| WO | 9931575 A1 | 6/1999 |

(Continued)

OTHER PUBLICATIONS

Martin Molina, "An Intelligent Assistant for Public Transport Management", Department of Artificial Intelligence, Universidad Politecnica de Madrid Campus de Montegancedo s/n 28660, Boadilla del Monte, Madrid, Spain. Aug. 2005.

(Continued)

*Primary Examiner* — McDieunel Marc
(74) *Attorney, Agent, or Firm* — Banner & Witcoff, Ltd.

(57) ABSTRACT

Methods, computer-readable media, software, and apparatuses provide a system for establishing base stations and allocating service vehicles to the base stations in order to provide roadside assistance. The system may include computing devices associated with customer vehicles and service vehicles as well as network computing devices. The system may receive a service request from a customer regarding a disabled vehicle. The system may then identify an appropriate service vehicle to assist the customer and assign the service request to the identified service vehicle. The system may select the appropriate service vehicle based on a location of the disabled vehicle. In an example, the system may choose a service vehicle from a base station closest to or within the shortest driving time to the disabled vehicle. By setting-up base stations in advance of service requests, service vehicles may reach disabled vehicles within a predetermined period of time.

20 Claims, 9 Drawing Sheets

Related U.S. Application Data continuation of application No. 14/208,883, filed on Mar. 13, 2014, now Pat. No. 9,053,588.

(51) Int. Cl.
*G06Q 10/10* (2012.01)
*G06Q 30/02* (2012.01)

(58) Field of Classification Search
CPC .... G06Q 40/12; H04W 64/00; H04W 88/005; H04W 4/02; H04W 24/00; H04W 24/10; H04W 4/22; H04W 64/006; H04W 76/007
USPC ............... 701/32.4; 342/451; 345/581, 589; 709/203, 205, 217
See application file for complete search history.

(56) References Cited

U.S. PATENT DOCUMENTS

| | | |
|---|---|---|
| 6,624,782 B2 | 9/2003 | Jocoy et al. |
| 7,809,367 B2 | 10/2010 | Hellaker |
| 8,229,462 B2 | 7/2012 | Bennett, Jr. |
| 8,503,643 B2 | 8/2013 | McKee et al. |
| 8,526,910 B2 | 9/2013 | Messerly |
| 9,053,588 B1 * | 6/2015 | Briggs .................. G07C 5/006 |
| 9,286,587 B2 * | 3/2016 | Briggs .................. G07C 5/006 |
| 2008/0177653 A1 | 7/2008 | Famolari et al. |
| 2009/0279681 A1 | 11/2009 | McKee et al. |
| 2010/0123565 A1 | 5/2010 | Kaufman et al. |
| 2010/0136954 A1 | 6/2010 | Bennett, Jr. |
| 2011/0210867 A1 | 9/2011 | Benedikt |
| 2012/0059676 A1 | 3/2012 | King |
| 2012/0258737 A1 | 10/2012 | Bennett, Jr. |
| 2013/0006469 A1 | 1/2013 | Green et al. |

FOREIGN PATENT DOCUMENTS

| | | |
|---|---|---|
| WO | 2012113084 A1 | 8/2012 |
| WO | 2013101055 A1 | 7/2013 |

OTHER PUBLICATIONS

Chris Thompson et al., "Using Smartphones to Detect Car Accidents and Provide Situational Awareness to Emergency Responders", Vanderbilt University, Institute for Software Integrated Systems, Jun. 30, 2010.

Insurance & Telematics: More Than Just Better Underwriting, 2013, pdfcrowd.com.

* cited by examiner

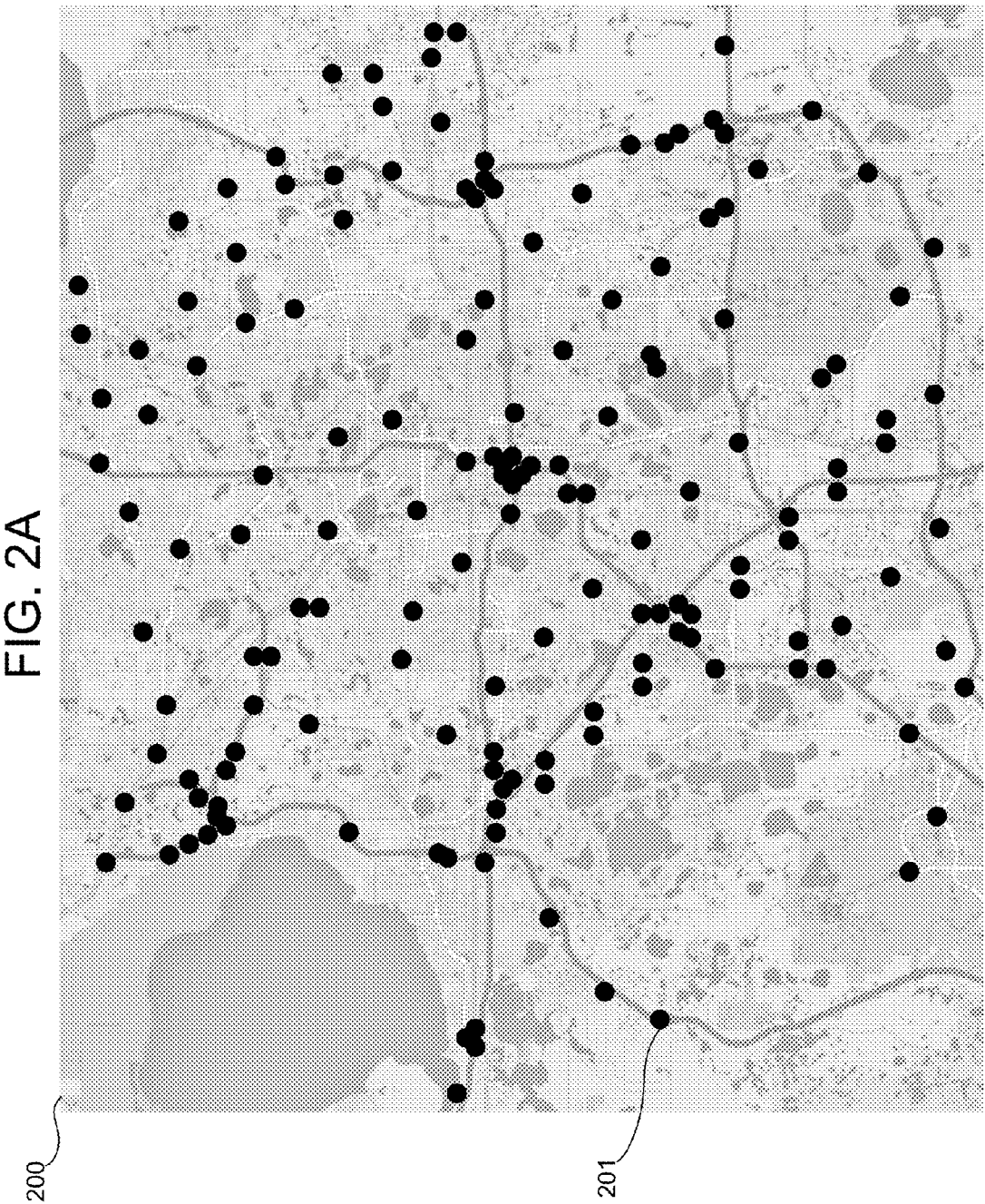

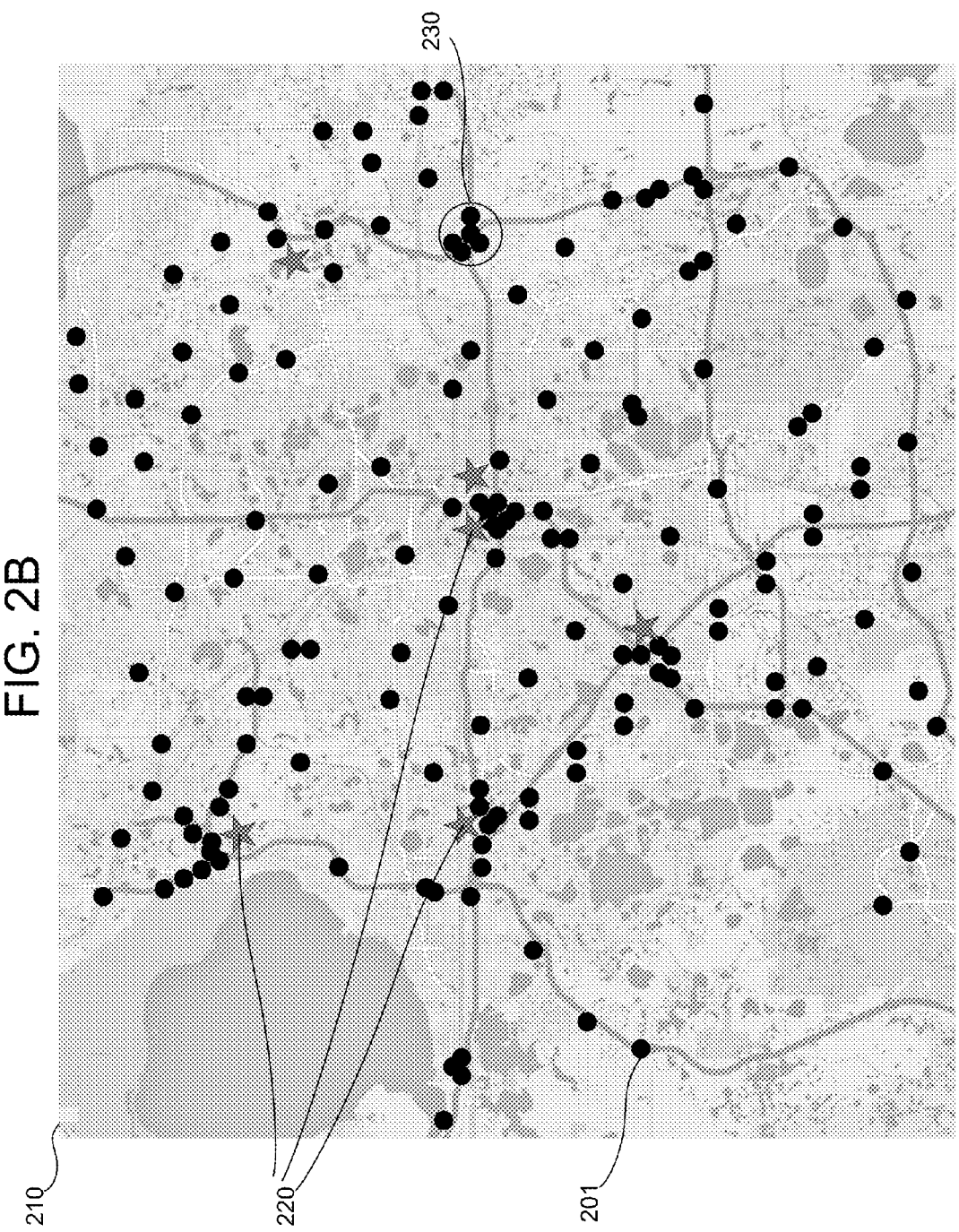

500

Hi John Doe.

Submit A Service Request

Step 1:
    Enter your car info here
        OR
    Select your car from your profile:
    - Ford Explorer (2008, black, etc.)
    - Chevy Camaro (2012, red, etc.)

Step 2:
    Choose Problem:
      ☐ engine    ☐ battery
      ☐ flat tire    ☐ unknown Step 3:
  Comments (e.g., accident):

[ Submit ]

Welcome Administrator – Amy A.

Service Request #ABC123:

Type message to customer:

[ Submit ]

Type message to service vehicle operator:

[ Submit ]

FIG. 6

ROADSIDE ASSISTANCE MANAGEMENT

CROSS-REFERENCE TO RELATED APPLICATIONS

This application is a continuation of and claims priority to U.S. patent application Ser. No. 14/705,387, filed on May 6, 2015, and entitled "Roadside Assistance Management," which is a continuation of and claims priority to U.S. patent application Ser. No. 14/208,883, now U.S. Pat. No. 9,053,588, filed on Mar. 13, 2014 and entitled "Roadside Assistance Management." The patents and patent applications listed in this paragraph are hereby incorporated by reference in their entireties.

FIELD OF ART

Aspects of the disclosure generally relate to methods and computer systems, including one or more computers particularly configured and/or executing computer software. More particularly, aspects of this disclosure relate to a system for organizing resources and providing roadside assistance.

BACKGROUND

Vehicles, such as automobiles, may become disabled during a trip as a result of, for example, a vehicle malfunction, a flat tire, and/or an accident. When these events occur, many drivers and/or passengers will attempt to call a tow truck company for assistance. In some cases, people do not know the name and/or telephone number of a tow truck company. This may be especially true when people travel outside a region they usually travel. With the proliferation of smartphones (and other portable devices), many people can now look up the names and telephone numbers of tow truck companies. Still, people may have difficulty determining which tow truck company is closest to the vicinity where there vehicle is disabled. Even if a person is able to determine the closest to tow truck company based on its address, this might not be an accurate indication of the closest available tow truck or which tow truck could respond the quickest. For example, a tow truck company nearest a disabled vehicle might not have a tow truck ready to provide assistance. Also, depending on the situation, certain equipment or skilled tow truck operators may be needed. Therefore, the closest tow truck might not always be able to provide the fastest solution.

A disabled vehicle can be a stressful situation, and thus, some drivers and passengers have previously signed up for, and/or pre-paid for, roadside assistance services, such as ONSTAR, services offered by dealerships, and/or services offered by car clubs (e.g., AAA). Despite these organizations, there is still a demand for fast and reliable roadside assistance. When people call for a tow truck, they would like an assurance that the tow truck will arrive within a certain period of time, so they are not waiting in limbo. Some, or all, organizations might not be capable of offering such an assurance because they do not own their own fleet of tow trucks and/or because it would be too costly to maintain a large enough fleet. Those organizations that rely on outside companies to supply the tow trucks and employ the tow truck operators may particularly have difficulty providing such an assurance because the time it takes to find an available and suitable tow truck once a request for service is received may significantly vary.

Accordingly, new systems, devices, methodologies, and software are desired to strategically place service vehicles and deploy the proper vehicle to assist customers (e.g., drivers and/or passengers of disabled vehicles).

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a roadside assistance management system that may organize resources to service requests within a certain period of time. In particular, the system may establish base stations and allocate service vehicles to the base stations in order to provide roadside assistance. The base stations may be established based on insurance claim information, accident report information from government bodies and other organizations, etc. The system may include computing devices associated with customer vehicles and service vehicles as well as network computing devices (e.g., computing devices in the "cloud" such as a server). The system may receive a service request from a customer regarding a disabled vehicle. The system may then identify an appropriate service vehicle to assist the customer and assign the service request to the identified service vehicle. The system may select the appropriate service vehicle based on a location of the disabled vehicle represented by, e.g., GPS coordinates of a mobile computing device or vehicle computing device associated with the disabled vehicle. In an example, the system may choose a service vehicle from a base station closest to or within the shortest driving time to the disabled vehicle. By setting-up base stations in advance, service vehicles may reach disabled vehicles within a predetermined period of time. Therefore, organizations managing the system may choose to advertise and/or promise the predetermined period of time for a particular service region (e.g., a metropolitan area).

Aspects of this disclosure provide a system comprising a first computing device associated with a first vehicle (e.g., a mobile computing device of a driver of the first vehicle) and a second computing device associated with a second vehicle (e.g., a mobile computing device of a driver of the second vehicle). The second vehicle may be stationed at a predetermined location that is established based on data indicating locations of accidents (e.g., data from insurance claims and government accident reports). The first and second computing devices may be, for example, a smartphone, tablet, etc., or a vehicle computing device installed in a vehicle. The first and second computing devices may be configured to communicate with other computing devices via a network. The system may also include a third computing device, which may be another computing device (e.g., a server) connected to the network (e.g., the Internet). The third computing device may be configured to receive first information from the first computing device. The first information may be a service request indicating that the first vehicle is disabled. Further, the third computing device may be configured to transmit second information to the second computing device in response to receiving the first information. The second information may indicate that a request for service has been received and may include a request to assign a job to handle the service request.

Aspects of the disclosure also provide the computing devices of the system as well as the computer readable media of those computing devices that store a roadside assistance management program. Specifically, aspects of the disclosure provide a computing device, comprising a network interface configured to communicate, via a network (e.g., the Internet and/or a cellular backhaul), with one or more first and second computing devices and at least one processor. The at least one processor may be configured to receive, via the network interface, a service request from a first computing device at a first location; identify one of the one or more second computing devices that is positioned to arrive at the first location within a predetermined time period; and assign, via the network interface, the service request to the identified second computing device. The predetermined time period may correspond to an advertised time period that is advertised in a region including the first location. In some examples, the processor may access, read, and write data to a particular memory device. The memory device may store computer-executable instructions of a roadside assistance management program.

Aspects of the disclosure further provide a method of allocating resources and handling service requests to provide roadside assistance. The method may include configuring a plurality of computing devices with a roadside assistance manager and/or a roadside assistance management program. Such configuring may include downloading and installing the roadside assistance management program. The method may further include steps of collecting data regarding locations of disabled vehicles within a service region, and establishing a plurality of base stations for the service region. Base stations may be established throughout the service region to reduce or optimize the response time to service requests. For example, a base station may be placed near a hot spot, where vehicles frequently become disabled. The method may further include assigning a plurality of service vehicles to a respective one of the plurality of base stations. In addition, the method may include receiving a service request for providing roadside assistance to a disabled vehicle within the service region; and identifying a service vehicle, from among the plurality of service vehicles, that is positioned to arrive at a location of the disabled vehicle within a predetermined time period (e.g., an advertised response time of 15 minutes). After identifying the service vehicle, the method may include assign the service request to the identified service vehicle. In some examples, the assigned request may be rejected and another service vehicle may be identified. Also, in some examples, the method may include tracking the assigned service vehicle and reassigning the service request to another service vehicle if the initial service vehicle is not on target to meet a predetermined response time. Further, in some embodiments of the system, a response time of, e.g., fifteen minutes, may be set to respond to customers, and the system may dispatch a taxi cab or other service vehicle to reach the customer within the set response time, particularly if a primary service vehicle (e.g., tow truck) is not on target to reach the customer within the set response time. For example, if a tow truck is not available to arrive at the location of a disabled vehicle, the system may dispatch a taxi cab to pick up the stranded customer with a goal response time while a tow truck travels to the location of the disabled vehicle.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIGS. 2A and 2B illustrate maps in accordance with aspects of the present disclosure.

FIGS. 5-8 illustrate high-level diagrams of example interfaces presented by computing devices configured according to aspects of the present disclosure.

DETAILED DESCRIPTION

Figure 1:
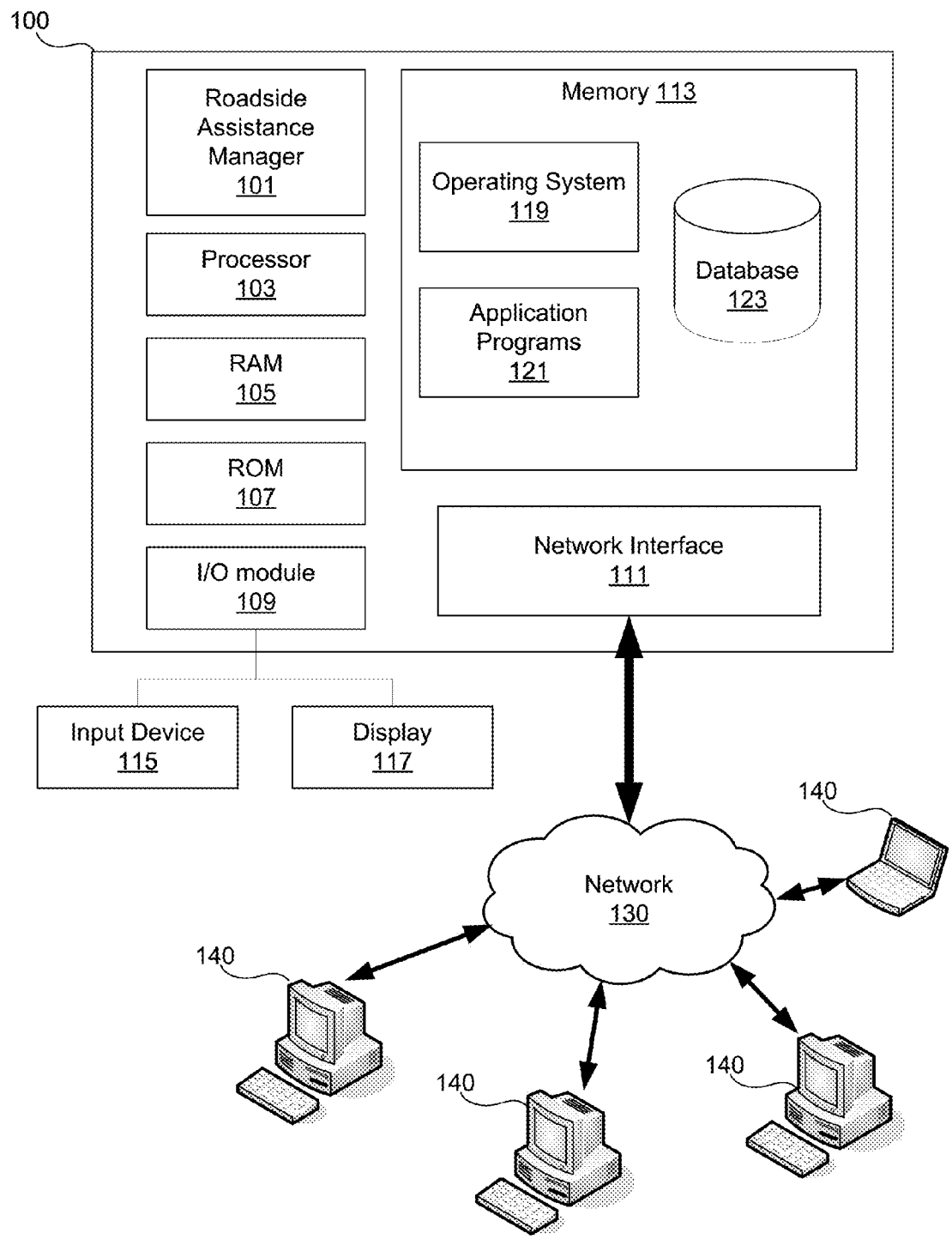
FIG. 1 is a block diagram of an example computing device that may be used according to an illustrative embodiment of the present disclosure.

In accordance with various aspects of the disclosure, methods, computer-readable media, software, and apparatuses are disclosed that provide a roadside assistance management system for organizing resources and deploying the proper assistance. The roadside assistance management system may utilize data related to accident information, such as where and when accidents occur, to position resources, including skilled servicemen and service vehicles. For example, the system may set up base stations in strategic positions to be able to quickly reach a large number of disabled vehicles. Moreover, the system may continuously analyze resources to allocate resources to the various base stations.

In addition, the roadside assistance management system may facilitate the collection of information from an operator (e.g., driver) and/or passenger of a disabled vehicle. Such information may include a description of the problem, characteristics of the vehicle, and/or a location of the disabled vehicle. Using this information, the system may determine the most suitable service vehicle (e.g., tow truck) that may provide the desired service within a certain period of time. The system may also generate a service request using the information and deliver the request to the most suitable service vehicle. Further, the system may track whether the request is accepted and monitor the progress of the service vehicle. For example, the system may determine if and when the chosen service vehicle is dispatched, and provide feedback to customers to keep them informed. If the initially chosen service vehicle does not accept the service request or is not on track to provide service within a certain period of time, the system may identify and dispatch another service vehicle.

Further, the system may dynamically allocate service vehicles so that, if a base station becomes shorthanded (e.g., has fewer service vehicles than desired), the system may transfer a service vehicle from another base station to the shorthanded base station. Additionally, the system may generate target goals and predict the levels of service it may provide based on the amount of resources available. For example, the system may determine whether it has sufficient resources to provide services within 15 minutes or whether it should only expect to be able to provide services within 20 minutes. The system may also collect and record performance data indicating whether goals are being met. Using the performance data the system may identify weaknesses and/or bottlenecks in providing roadside assistance. The performance data may also be used to dynamically allocate services vehicles. In some cases, the system may also facilitate billing. For example, where the system utilizes various tow truck companies, the system may track the amount of money owed to the different tow truck companies.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a roadside assistance manager 101 for performing methods and executing instructions of the roadside assistance management program described herein. The roadside assistance manager 101 may be implemented with one or more processors and one or more storage units (e.g., databases, RAM, ROM, and other computer-readable media), one or more application specific integrated circuits (ASICs), and/or other hardware components. Throughout this disclosure, the roadside assistance manager 101 may refer to the software and/or hardware used to implement the roadside assistance manager 101. The one or more processors of the roadside assistance manager 101 may operate in addition to or in conjunction with another general processor 103 of the computing device 100. Both the roadside assistance manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the roadside assistance management program, such as rules for identifying locations for base stations, rules for allocating service vehicles and servicemen to various base stations, and rules for handling a service request, such as what information should be collected from customers (e.g. drivers and/or passengers), how a particular service vehicle should be selected, how a service request to a provider should be generated, what feedback should be provided to customers, etc. On some computing devices 100, the input device 115 may be operated by users (e.g., customers) to interact with the roadside assistance management program, including providing user information and/or preferences, vehicle information (e.g., make and model of a vehicle), sending service requests, etc., as described in further detail below. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet, a cellular network, or satellite network. Through the network 130, the computing device 100 may communicate with one or more other computing devices 140, such as laptops, notebooks, smartphones, personal computers, servers, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 might not include the processor 103 in addition to one or more processors of the roadside assistance manager 101. On the other hand, the computing device 100 may be a mobile device (e.g., a smartphone, tablet, etc.), and thus, may also include various other components, such as a battery, speaker, and/or antennas (not shown). Also, the computing device 100 may be a vehicle computing device 100 (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.).

FIG. 2A illustrates an example map 200 in accordance with the present disclosure. As shown in FIG. 2A, the map 200 may illustrate a location of a disabled vehicle (e.g., a location of a broken down vehicle that has requested service) within a geographical region. Different maps may be used for different geographical regions. Further, the maps may have different scales depending on the particular geographical region. For example, the map may cover a larger area if the map includes a populated city than if the map were to include a less populated city. On the other hand, the map may cover a larger area including more rural areas where there might be less traffic than an urban area where more traffic would be expected. If the city is especially densely populated, multiple maps may be used to cover the city. The coverage area of the map 200 may correspond to one or more zip codes, area codes, or other geographical region identifiers. Alternatively, the coverage area of the map 200 may be selected by an administrator or other user of the roadside assistance management system.

In the map 200, each dot 201 may represent a location of a single disabled vehicle. In some embodiments, particularly when a large number of vehicles become disabled in a similar location, a single dot 201 may represent multiple disabled vehicles (e.g., 10 vehicles). Also, in some embodiments, the dots 201 may be colored or shaped differently to illustrate a particular period of a day in which the corresponding vehicle was disabled. For example, a day may be segmented into a plurality of time periods, where each period corresponds to one of four different levels of demand for roadside assistance service, and thus, each dot 201 may have one of four different patterns (e.g., a blue square). Alternatively, or additionally, the roadside assistance management system may use different maps for different time periods. For example, the roadside assistance management system may use one map for one time period and another map for another time period. The different maps and/or patterns (e.g., color and/or shape combinations) provide visual indicators for users of the map(s) to appreciate the large volume of data. To provide such a visual aid, the roadside assistance management system may maintain a database, including the map data and dot data, and a processor (e.g., a graphics processing unit) for overlaying the dot data on the map data. The dot data may include information indicating an associated level of demand (e.g., high, high-medium, medium-low, low) or associated time period (e.g., 7 am-11 am), rather than indicating the shape or color of the dot (which might be a user preference of a user viewing the map). In other words, dot data for a particular dot may include, e.g., a binary value of "01" indicating that the particular dot is associated with a specific time period or specific level of demand.

The roadside assistance management system may create the map 200 or import the map 200 from another source. The data for placing the dots 201 may be obtained from one or more databases. These databases may include various external or internal databases. For example, the data for placing the dots 201 may be obtained from an insurance company's database of claim information. When a customer submits a claim for insurance coverage (e.g., because the customer was in an accident) to an insurance company, the insurance company may collect a location of an incident associated with the claim (e.g., location of an accident). Additionally, or alternatively, the location of disabled vehicles may be obtained from accident reports which may be maintained by local municipalities (e.g., local law enforcement), large-scale transit authorities (e.g., U.S. Department of Transportation, Federal Transit Administration, city transit authorities), and/or other organizations. The location information stored in the various databases may be in different forms, such as GPS coordinates, mile markers of roads, nearest intersections, nearest address, etc. The roadside assistance management system may, therefore, merge or compile the different data into one set of data when generating the map 200 with the dots 201. Merging, for example, may include converting all location information into a common format (e.g., GPS coordinates).

FIG. 2B illustrates another example map 210 in accordance with aspects of the present disclosure. The map 210 is similar to the map 200, but further depicts locations of base stations 220 (see star shapes in FIG. 2B). The base stations 220 correspond to designated areas where servicemen and service vehicles are stationed to wait for assignment to a job. The locations of the base stations 220 may be determined manually, automatically, or by a combination of both automatic and manual processes (e.g., a general area may be determined automatically and an administrator may negotiate to obtain rights/permission to set up a base station at a particular location within that general area). An objective of the roadside assistance management system may include determining locations of base stations 220 to optimize use of resources to respond to all predicted service requests within a certain response time. As shown in FIG. 2B, the base stations 220 may be located in close proximity to areas where vehicles frequently become disabled. That is, the base stations 220 may be located in close proximity to parts of the map 210 exhibiting a relatively high density of dots 201. As illustrated in the middle portion of the map 210, the number of accidents may be especially great thereby justifying multiple base stations 220. For example, there may be a relatively large number of accidents near the center of a city in comparison to the outskirts of the city, and therefore, multiple base stations 220 may be located near the center of the city. In some cases, base stations 220 might not be in the vicinity of an area where there are a lot of dots, but rather may be located between two areas so that it can service both areas. In determining locations for the base stations 220, geographical distance from the dots may be considered, but that might not be the only consideration. The locations of the base stations 220 may also depend on the driving distance and/or driving time to areas where vehicles frequently become disabled. A base station 220 may be positioned, for example, where a tow truck may easily access one or more highways, so that the tow truck may quickly reach many areas. Determining the location of a base station may even take into consideration traffic patterns. A tow truck that can avoid traffic may respond more quickly to service requests.

In some embodiments, the roadside assistance management system may collect information, such as locations of disabled vehicles (e.g., dot data), traffic information (e.g., which roads experience what amount of traffic), vehicle travel times (e.g., how long it takes a vehicle to travel over a particular stretch of a road), speed limit information, and/or roadway information (e.g., distances and/or quality of roads), and prepare the information for presentation to administrators for manual selection of base stations 220. For example, the roadside assistance management system may generate a map 200, so administrators may determine locations of base stations 220 (thereby generating the map 210 of FIG. 2B). However, in some embodiments, the roadside assistance management system may automatically assist in determining the locations of the base stations 220. For example, the roadside assistance management system may determine an optimal number of base stations for servicing a given region. The system may compute the number of base stations 220 based on an algorithm taking into consideration the number of disabled vehicles (e.g., number of dots) and/or dimensions of a service region to be covered. The system may also compute the number of base stations 220 by determining a number of "hot spots" 230 (i.e., areas where the density of disabled vehicles exceeds a predetermined threshold) within the service region. Different thresholds for different size areas (e.g., a lower threshold for a larger area) may be used to identify hot spots 230. Also, different thresholds may be used for different service regions and may depend on a target service response time. Although FIG. 2 illustrates only one hot spot 230, more hot spots on the map 210 may exist.

Additionally, the system may automatically determine a number of servicemen and/or service vehicles needed to meet a certain response time. For example, if a target response time of fifteen (15) minutes is set, the system may determine a specific number of servicemen and and/or service vehicles desired for servicing a defined service region given the historical data representing the number of disabled vehicles in that service region and/or locations of base stations 220. The system may also determine how large (e.g., how many servicemen and/or service vehicles) each of the base stations 220 should be. Various algorithms may be used to determine the number of servicemen, service vehicles, and/or base stations 220. In some embodiments, an algorithm may use historical trends, customer incident rates in an area, a number of service vehicles under management, local traffic patterns, special events (e.g., concerts, sporting events, etc.), and/or weather to forecast demand for service. The number and/or locations of base stations 220 may be calculated based on the demand forecast and geographic information systems (GIS), such as maps, traffic information, routing, estimated times of arrival (based on estimated travel speeds (using speed limit information) and distances). The number of base stations 220 and number of service vehicles assigned thereto may vary by time of day as demand fluctuates.

Figure 3:
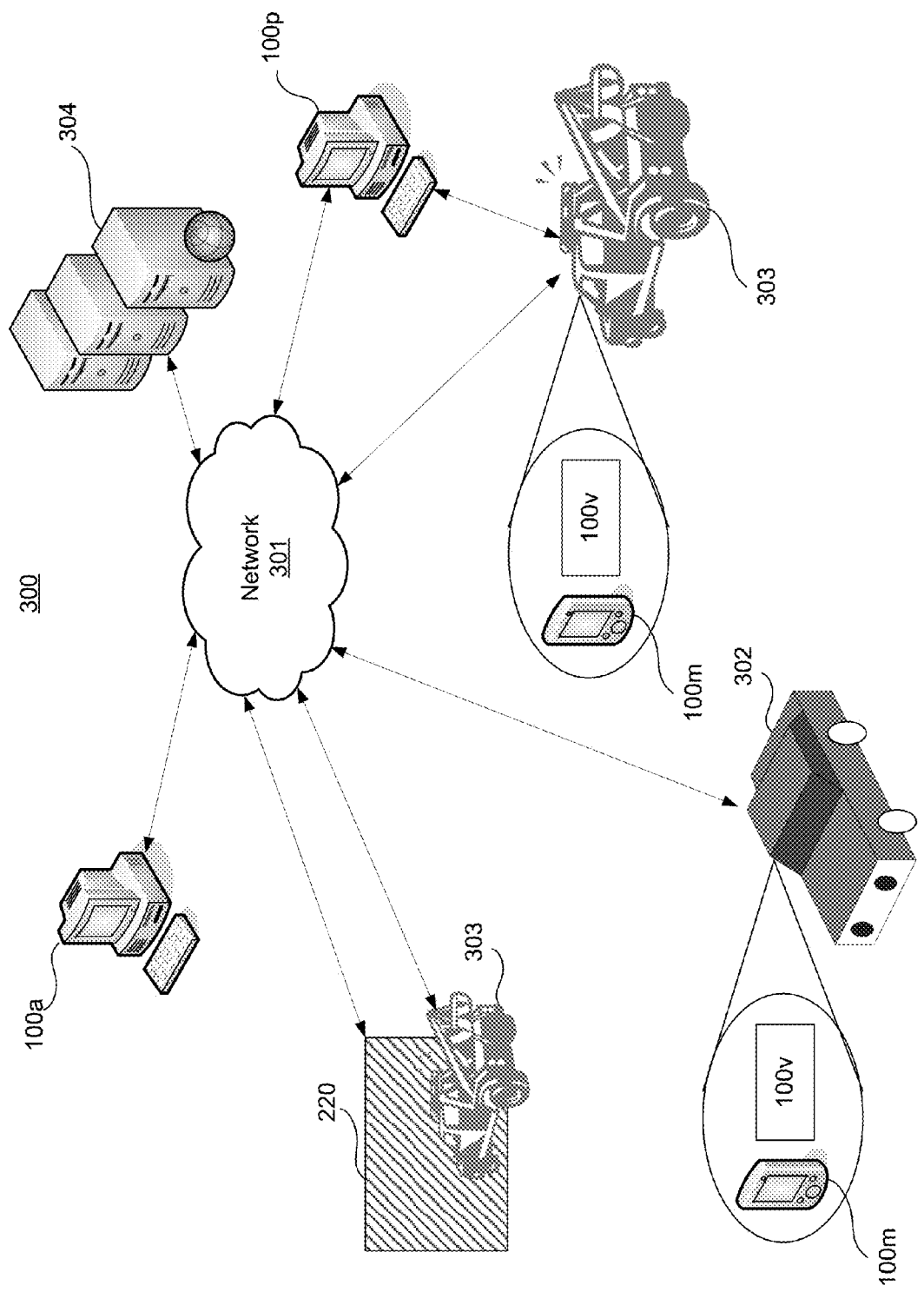
FIG. 3 illustrates an example network environment in which a system in accordance with the present disclosure may be implemented.

The methods and software for facilitating roadside assistance as disclosed herein may be implemented on one or more computing devices 100 used in various network environments. FIG. 3 illustrates an example network environment 300 for implementing methods according to the present disclosure. As shown in FIG. 3, the network environment 300 may include a network 301 configured to connect computing devices within or associated with customer vehicles 302 (e.g., vehicles which may be become disabled), computing devices within or associated with service vehicles 303, one or more base stations 220, one or more administrative computing devices 100a, one or more service provider computing devices 100p, and one or more application servers 304. Collectively, these computing devices may form a roadside assistance management system. The network 301 may be any type of network, like the network 130 described above, and use one or more communication protocols (e.g., protocols for the Internet (IP), Bluetooth, cellular communications, satellite communications, etc.) to connect computing devices and servers within the network environment 300 so they may send and receive communications between each other. In particular, the network 301 may include a cellular network and its components, such as cell towers. Accordingly, for example, a mobile computing device 100m (e.g., a smartphone) of a person in vehicle 302 may communicate, via a cellular backhaul of the network 301, with an application server 304 to request roadside assistance. While FIG. 3 illustrates that the mobile computing devices 100m within customer vehicles 302 and service vehicles 303 connect to the network 301, it should be understood that these same mobile computing devices 100m may connect to the network 301 even if they are removed from the vehicles 302, 303.

FIG. 3 illustrates only one customer vehicle 302. However, the roadside assistance management system may be configured to communicate with multiple customer vehicles 302 simultaneously so that it may process service requests simultaneously. Also, although FIG. 3 depicts the customer vehicle 302 as a car, customer vehicles 302 may be any type of vehicle, including a motorcycle, bicycle, scooter, drone (or other automated device), truck, bus, boat, plane, helicopter, etc. Similarly, the roadside assistance management system may be configured to communicate with multiple service vehicles 303 simultaneously so that it may assign different jobs simultaneously. Also, although FIG. 3 depicts the service vehicle 303 as a tow truck, service vehicles 302 may be a different type of truck or any other type of vehicle, including a motorcycle, car, van, bicycle, scooter, drone (or other automated device), bus, boat, plane, helicopter, etc.

FIG. 3 also illustrates an example subsystem within the network environment 300. Specifically, FIG. 3 illustrates an example arrangement of computing devices that may exist within the customer vehicles 302 and service vehicles 303. To depict these computing devices, FIG. 3 includes a view of the inside of a customer vehicle 302 and a view of the inside of a service vehicle 303. As shown in FIG. 3, the customer vehicles 302 and/or service vehicles 303 may include a mobile computing device 100m and/or a vehicle computing device 100v. In some embodiments, the mobile computing device 100m and vehicle computing device 100v may communicate with one another (e.g., via Bluetooth). The mobile computing device 100m may be any mobile computing device (e.g., a smartphone, tablet, etc.) that is associated with a driver or passenger of the vehicle 302. The mobile computing device 100m may be configured in a similar manner to the computing device 100 of FIG. 1. Further, the mobile computing device 100m may be configured to execute a roadside assistance program (or roadside assistance computer application) that provides a user interface for a customer to provide inputs to and receive outputs from the roadside assistance management system. Such a roadside assistance program may be downloaded or otherwise installed onto the mobile computing device 100m using known methods. Once installed onto the vehicle computing device 100v, a user may launch the roadside assistance program by, for example, operating buttons or a touchscreen on the mobile computing device 100m. Additionally, or alternatively, the mobile computing device 100m may be configured to execute a web browser (e.g., an application for accessing and navigating the Internet) to access a web page providing an interface for the roadside assistance management system. In some embodiments, the mobile computing device 100m may also be configured to collect drive data using, e.g., its accelerometer, GPS, gyroscope, etc. Drive data may include vehicle telematics data or any other data related to events occurring during a vehicle's trip (e.g., an impact to a part of the vehicle, a deployed airbag, etc.). Drive data may also include location information, such as GPS coordinates, indicating the geographical location of the mobile computing device.

Although FIG. 3 depicts just one mobile computing device 100m within the customer vehicle 302 and service vehicle 303, there may be more or less mobile computing devices 100m in some cases. For example, the customer vehicle 302 may carry one or more passengers in addition to the driver, and each person may have one or more mobile computing devices 100m. Or, for example, the people in the customer vehicle 302 might not have a mobile computing device 100m or might have left their mobile computing device 100m elsewhere. Also, if the vehicle is autonomous, there might not be any mobile computing device 100m.

As mentioned above, the customer vehicles 302 and service vehicles 303 may also include a vehicle computing device 100v. The mobile computing device 100m may be configured in a similar manner to the computing device 100 of FIG. 1. Further, the vehicle computing device 100v may be configured to execute a roadside assistance program (or roadside assistance computer application) that provides a user interface for a customer to provide inputs to and receive outputs from the roadside assistance management system. Such a roadside assistance program may be downloaded or otherwise installed onto the vehicle computing device 100v using known methods. Once installed onto the vehicle computing device 100v, a user may launch the roadside assistance program by, for example, operating buttons or a touchscreen on the dashboard of the vehicle 302, 303. Additionally, or alternatively, the vehicle computing device 100v may be configured to execute a web browser to access a web page providing an interface for the roadside assistance management system. In some embodiments, the vehicle computing device 100v may also be configured to collect drive data using, e.g., its accelerometer, GPS, gyroscope, etc. As mentioned above, this drive data may include vehicle telematics data or any other data related to events occurring during a vehicle's trip (e.g., an impact to a part of the vehicle, a deployed airbag, or other event triggered by a sensor of the vehicle). The vehicle 302, 303 may have a GPS installed therein, and therefore, the vehicle computing device 100v may also collect GPS coordinates.

Further, the vehicle computing device 100v may be a system including multiple devices. For example, the vehicle computing device 100v may include the vehicle's on-board diagnostic (OBD) system. The vehicle computing device 100v may be configured to interface with one or more vehicle sensors (e.g., fuel gauge, tire pressure sensors, engine temperature sensors, etc.). The vehicle computing device 100v may also interface with the mobile computing device 100m via a wired connection (e.g., USB, OBD II connector, etc.) or a wireless connection (e.g., Bluetooth). In some embodiments, there might not be a vehicle computing device 100v installed in the customer vehicle 302 or service vehicle 303 that is configurable to interface with the roadside assistance management system, or the vehicle computing device 100v might not be able to communicate with any of the mobile computing devices 100m. Still, in some cases, the vehicle computing device 100v might be configured so that it only communicates with the mobile computing devices 100m within the same vehicle 302, 303.

In some embodiments, one or more of the customer vehicles 302 or service vehicles 303 may be autonomous or in an autonomous mode (e.g., auto-pilot mode). An autonomously controlled vehicle 302, 303 may be controlled by its vehicle computing device 100v and/or a remote computing device (e.g., administrative computing device 100a). The vehicle computing device 100v may employ sensors for inputting information related to a vehicle's 302, 303 surroundings (e.g., distance from nearby objects) and use the inputted information to control components of the vehicle 302, 303 to steer the vehicle 302, 303.

In some embodiments, the roadside assistance management system may include one or more of the application servers 304. An application server 304 may be configured to receive and process service requests. As will be described further herein, when customer vehicles 302 become disabled, customers may use mobile computing devices 100m or vehicle computing devices 100v to submit requests for service to one or more of the application servers 304, which in turn may identify an appropriate service vehicle 303 and direct the identified service vehicle 303 to the location of the customer's vehicle 302. In some embodiments, an application server 304 may host a website that customers can visit to submit their service requests and check on the progress of their service request and/or view past service requests and performance information thereof. Insurers may also access the application servers 304 to monitor the performance of the roadside assistance management system. In some examples, the application server 304 may collect performance information indicating how fast service requests where processed and which service vehicles 303 arrived at job locations at which times. The application servers 304 may also include databases storing accident report information (e.g., location and time of accidents) and/or insurance claim information.

Further, in some embodiments, the application servers may generate map data to produce maps similar to the maps 200, 210 of FIGS. 2A and 2B. Additionally, in some embodiments, the application servers 304 may also include databases including other information that may be used to assist service vehicles 303. For example, the application servers 304 may include traffic information and route information for assisting service vehicles 303 to quickly and reliably arrive at job locations (e.g., locations of disabled customer vehicles 302) or at base stations 220. Or, for example, the application servers 304 may include help information that may be used by servicemen to perform service on the disabled customer vehicles 302. Also, the application servers 304 may include templates and other forms for distributing to customers to acquire feedback. The application servers 304 may also be configured to receive and store such feedback.

Still referring to FIG. 3, the administrative computing device 100a may be configured to generate, edit, manage, and deliver the roadside assistance management program. In some examples, the administrative computing device 100a may execute the roadside assistance management program in tandem with a mobile computing device 100m and/or vehicle computing device 100v. The administrative computing device 100a may, for example, render graphics and webpages which are then streamed to the mobile computing devices 100m and/or vehicle computing devices 100v within the vehicles 302, 303, which may be used to supply user inputs so that the user may interact with the roadside assistance management program. In some embodiments, an operator, administrator, or other personnel of the organization providing the roadside assistance management system may use the administrative computing device 100a to communicate with customers. For example, the administrative computing device 100a may execute the roadside assistance program to allow an operator to communicate with customers (e.g., in a live online chat session) to obtain information about a service request and provide assistance. In some embodiments, the roadside assistance management program may include a suite of computer programs, including one or more programs for customers, one or more programs for the administrative computing device 100a operated by personnel of the organization providing the roadside assistance management system, one or more programs for service provider computing devices 100p, and one or more programs for operators of the service vehicle 303.

The service provider computing device 100p may be owned and/or operated by a service provider (e.g., a tow truck company). The service provider may be a subsidiary or division of the organization providing the roadside assistance management system or a third party (e.g., contracting tow truck company). Although FIG. 3 illustrates only one service provider computing device 100p, each service provider may have a service provider computing device 100p. Each service provider computing device 100p may be located at a respective service provider's office and may be operated by a respective operator (e.g., dispatcher) of the service provider. Specifically, the service provider computing device 100p may be used to receive service requests and assign service vehicles 303 and servicemen to certain jobs.

In some cases, the service provider computing device 100p may be located at a base station 220. For example, a base station 220 may correspond to a tow truck company's tow lot (or other place of business). In other cases, the base stations 220 may be independent from control of any one service provider, and instead, may be owned or controlled by an organization providing the roadside assistance management system (e.g., an insurance company or roadside assistance business unit thereof). In either case, and particularly in such other cases, the base stations 220 may be equipped with a computing device (not shown in FIG. 3) that allows it to communicate with the remaining devices of the roadside assistance management system via the network 301. For example, a person may be employed to manage a base station 220 and the servicemen and service vehicles 303 at the base station 220. As such, this person may be supplied with a computing device 100 to receive service requests so he/she may dispatch the appropriate serviceman and service vehicle 303 to a particular job.

Figure 4A:
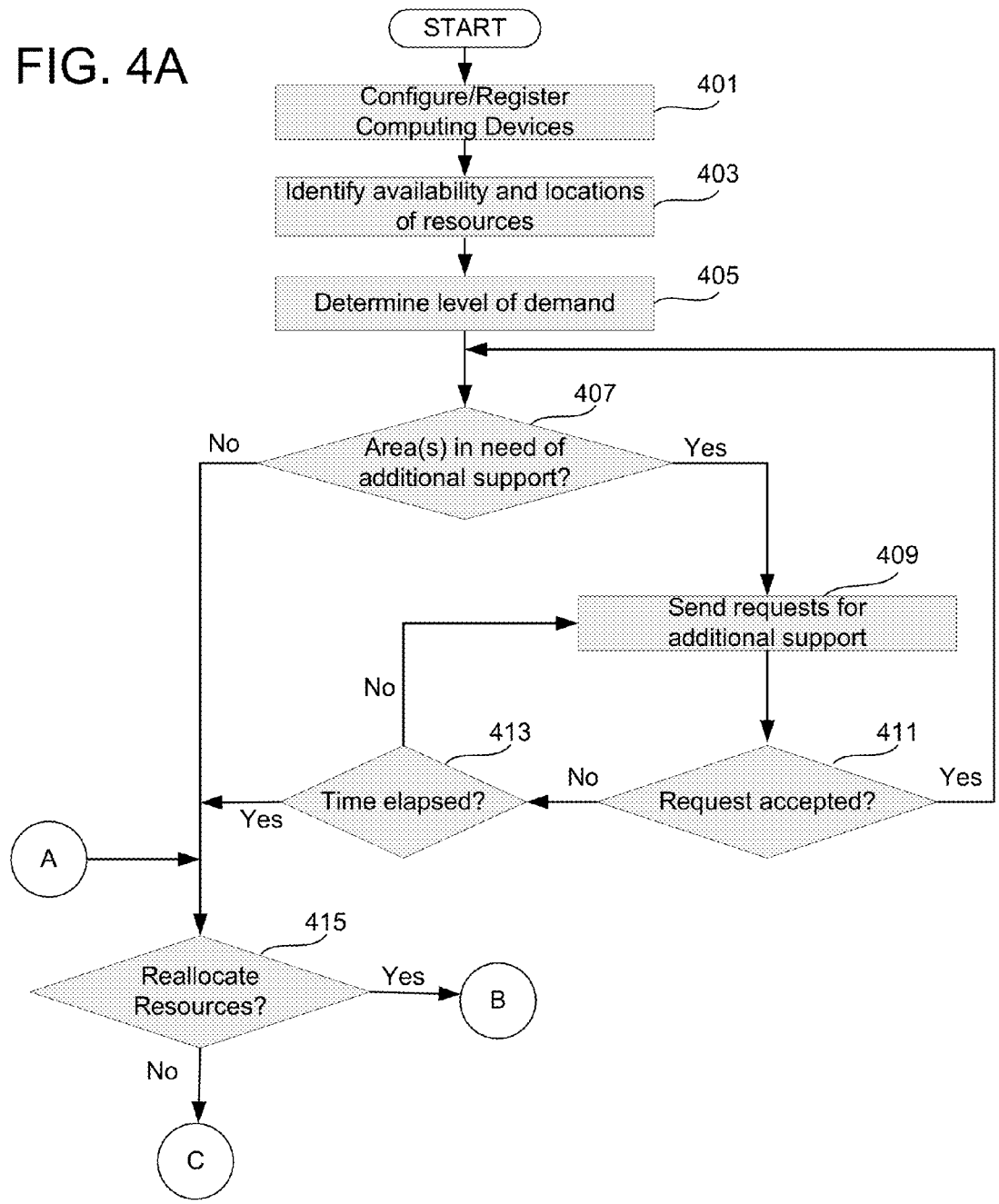
FIGS. 4A, 4B, and 4C illustrate flow diagrams of an example process in accordance with aspects of the present disclosure.

FIG. 4 illustrates a flow diagram for an example method in accordance with aspects of the present disclosure. More specifically, FIG. 4 illustrates a plurality of steps of a method for providing roadside assistance. The steps of FIG. 4 may be performed by various devices disclosed herein, such as the administrative computing device 100a, the mobile computing device 100m, the vehicle computing device 100v, the service provider computing device 100p, and/or the application servers 304, which collectively form the roadside assistance management system. One or more of the steps of FIG. 4 may be performed by executing a roadside assistance management program and/or operating a particularly configured computing device of the roadside assistance management system. As a result of the method of FIG. 4, service vehicles 303 may be managed to provide fast and reliable roadside assistance to disabled customer vehicles 302 (e.g., a broken down car).

The method of FIG. 4 may begin with a step 401 of configuring and/or registering the computing devices of the roadside assistance management system. For example, configuring a mobile computing device 100m of a customer or serviceman may include installing an appropriate roadside assistance management program thereon. Each computing device may install a different version of the roadside assistance management program depending on its platform. For example, a computing device running the iOS™ operating system may download a different version of the roadside assistance management program than a device running the ANDROID™ operating system. Also, in some cases, step 401 may include downloading the roadside assistance management program onto a mobile computing device 100m, vehicle computing device 100v, or service provider computing device 100p from an administrative computing device 100a or application server 304 via the network 301.

Step 401 may also include registering a computing device with the organization (e.g., an insurance company) providing the roadside assistance management system. Registering a computing device may include creating and/or logging into an account with an associated username and/or password. The account may be associated with the computing device and/or user of the computing device. To perform registration, the organization providing the roadside assistance management system may request various information, including information regarding a user device (e.g., device identifier, device make, device model, etc.), information regarding a user (e.g., name, birthdate, address, insurance policy number, etc.), and/or information regarding a vehicle (e.g., make, model, year, vehicle identification number (VIN), etc.). Registration may also include setting up an account for billing purposes. For example, a service provider may provide an account (e.g., a bank account) into which funds may be transferred when the service provider performs a job. Or, for example, a customer may provide an account from which funds may be transferred when a service is provided to the customer (e.g., when a customer's vehicle 302 is fixed or towed to a drop-off point).

In some embodiments, when registering with the roadside assistance management system, a user may create a profile. The profile may include certain user preferences so that a customized experience may be realized. For example, a user may create settings that affect how a user enters information and which types of information may be entered when a service request is generated. Such settings may be used to automatically populate certain fields of a request, so the user does not have to enter all information every time a service request is desired. For example, a customer may enter vehicle information, so the customer can simply choose his/her vehicle when generating a service request. Further, the profile may also include one or more listings identifying preferred service providers (e.g., tow truck companies), mechanics, or drop-off locations.

In step 403, the roadside assistance management system may identify availability and locations of resources. For example, the roadside assistance management system may identify which servicemen and service vehicles 303 are located at which base stations 220. To aid this identification at step 403, drivers may be instructed to indicate their arrival at a base station 220 (like when an employee "punches-in" at work), so that the system may receive and store information that drivers are available at a base station 220. Alternatively, or additionally, the system may poll mobile computing devices 100m of servicemen (e.g., drivers) and/or vehicle computing devices 100v to determine the location of the servicemen and service vehicles 303. That is, mobile computing devices 100m and vehicle computing devices 100v may determine their location (e.g., GPS coordinates) and provide location information to the system. This reporting of location information may be done intermittently (e.g., periodically) or in response to the polling described above. As a result, the system may determine that three (3) drivers/tow trucks from Service Provider A are at Base Station 1, while one (1) driver/tow truck from Service Provider A and two (2) drivers/tow trucks from Service Provider B are at Base Station 2.

At step 405, the roadside assistance management system may determine a level of demand based on time. It has been observed that the number of service requests for disabled vehicles can depend on a time and date. For example, the number of disabled vehicles may generally be greater on Monday through Friday during rush hour periods when people generally commute to work. The roadside assistance management system may seek to use this knowledge to optimize the use of its resources (e.g., ensure that it has enough resources to provide service to expected service requests while minimizing wasted resources). To accomplish this, the roadside assistance management system may set up a number of different levels of demand corresponding to different time segments. For example, the roadside assistance management system may establish four levels of demand: 1) high; 2) high-medium; 3) medium-low; and 4) low. Each of these levels may be associated with a different time and date segment. Vice versa, each time and date may be associated with one of the levels of demand. For example, on a Monday, a time period of 12 am-5 am may be associated with a low level of demand; a time period of 5 am-7 am may be associated with a medium-low level of demand; a time period of 7 am-11 am may be associated with a high level of demand; a time period of 11 am-6 pm may be associated with a high-medium level of demand; a time period of 6 pm-11 pm may be associated with a medium-low level of demand; and a time period of 11 pm-midnight may be associated with a low level of demand. The number of time periods and the ranges of time periods may vary. The number of levels of demand may also vary. There may be less than or more than four levels of demand. By classifying time and date segments as belonging to one of the four levels of demand, the system may reduce or avoid excessive adjustments. That is, using classifications may allow for automated allocation of resources and keep the system from overreacting to the continuously changing environment.

In step 407, the roadside assistance management system may determine area(s) in need of support. For example, the system may determine which base stations 220, if any, are under-equipped (e.g., do not have enough service vehicles 303) or under-staffed (e.g., do not have enough tow truck operators). To facilitate the determination of step 407, the roadside assistance management system may store and maintain a schedule of which servicemen and service vehicles 303 are supposed to be at which base stations 220 during which times. For example, the system may store a schedule indicating that three (3) drivers/tow trucks from Service Provider A should be at Base Station 1 at 8 am on a Monday, while two (2) drivers/tow trucks from Service Provider A and five (5) drivers/tow trucks from Service Provider B should be at Base Station 2 at 8 am on a Monday. Such a schedule may be generated based on the map data of a map similar to the maps 200, 210 of FIGS. 2A and 2B. Using this schedule, the system may confirm whether the appropriate resources (e.g., drivers and tow trucks) are located at the appropriate base stations 220. Further, the determination of whether an area is in need of support may depend on a promoted (e.g., advertised) response time for a service region including the area. For example, if a response time of 15 minutes is promised (or guaranteed) for a certain region, the system may determine whether the resources identified in step 403 are sufficient to meet that time. For shorter response times, more resources may be needed. If a response time of 25 minutes is promised, the system may determine that it has enough resources to meet the promised response time, whereas if a response time of 20 minutes is promised, the system may determine that it might not have enough resources to fulfill its promise. Different response times may be provided to different service regions (e.g., cities, counties, zip codes, etc.), and even areas (e.g., zip codes) within the larger service region.

In some embodiments, the system may intermittently (e.g., periodically or according to a schedule, which may correspond to different time periods of demand) calculate an estimated time of arrival based on conditions (e.g., traffic, weather, etc.) and route options. If the system then detects that events or conditions may prevent service vehicles from responding in time (e.g., within 15 mins.), the system may trigger alerts that cause servicemen and/or administrators to take actions. Such actions may include notifying customers that estimated times of arrival have been adjusted. For example, if a customer requests service, the customer may be informed that the response time has been changed from 15 minutes to 20 minutes due to current conditions. Assignments of jobs may also be modified in view of the most recently calculated estimated time of arrivals.

If the system determines that one or more areas are in need of support (YES at step 407), the system may send a request to one or more (or all) service providers for additional support at step 409. For example, the application server(s) 304 may determine that additional support is needed, and may generate and broadcast a request to one or more service provider computing devices 100p. Depending on where the additional support is needed, the system may determine which service providers to contact first for the additional support. The request for additional support may identify the location of where the additional support is desired and/or a reward (e.g., a monetary offer) for providing the additional support. The reward or offer may incentivize a service provider to provide the additional support.

An operator of a provider (using a service provider computing device 100p) or a serviceman (using a mobile computing device 100m or vehicle computing device 100v), may accept or reject the request for additional support. In step 411, the system may determine whether the request for additional support was accepted or rejected by a service provider. The system may determine that the request for additional support is not accepted (and therefore rejected), if no response is received after a predetermined amount of time. If the request for additional support is rejected, the system may determine whether to continue to search for additional support at step 413. The determination of step 413 may be based on how much time has elapsed since beginning to request for additional support. If a predetermined amount of time has elapsed (YES at step 413), the system may jump to step 415 described below. Otherwise (NO at step 413), the system may return to step 409 to send additional requests for the additional support. Alternatively, step 413 may be based on a number of requests sent or to whom requests have been sent. For example, if all service providers have already been solicited for the additional support, the system may jump to step 415.

Returning to step 411, if the request for additional support is accepted, the system may update its records and return to step 407 to determine if other areas are still in need of support. If the system at step 407 determines that there are no areas in need of support (NO at step 407; either because there were none identified initially or additional support has been accepted), the system may proceed to step 415.

At step 415, the system may determine whether to reallocate resources. For example, the system may determine whether it should direct servicemen or service vehicles 303 to different base stations 220. The determination to reallocate in step 415 may be different from the determination of whether areas are in need of additional support in step 409. While the system at steps 409-413 seeks to acquire additional resources for the environment, the system in step 415 and the subroutine described below seeks to move around the resources it has.

To make the determination at step 415, the system may determine whether the status of resources is within a tolerance and/or whether it is even possible to reallocate resources to meet the promoted response time. For example, the system might determine that it does not make sense to direct a service vehicle 303 from a first base station 220 to a second base station 220, if doing so will result in the first base station 220 becoming under-equipped. The determination in step 415 may consider the promoted service response time for a particular service region. If the promoted service response time is 15 minutes and the tolerance is set at 3 minutes, the system may determine reallocation is not necessary if the distribution of the resources are presently sufficient to provide a response time of 17 minutes (because 17 minutes is within the tolerance (18=15+3)).

Figure 4B:
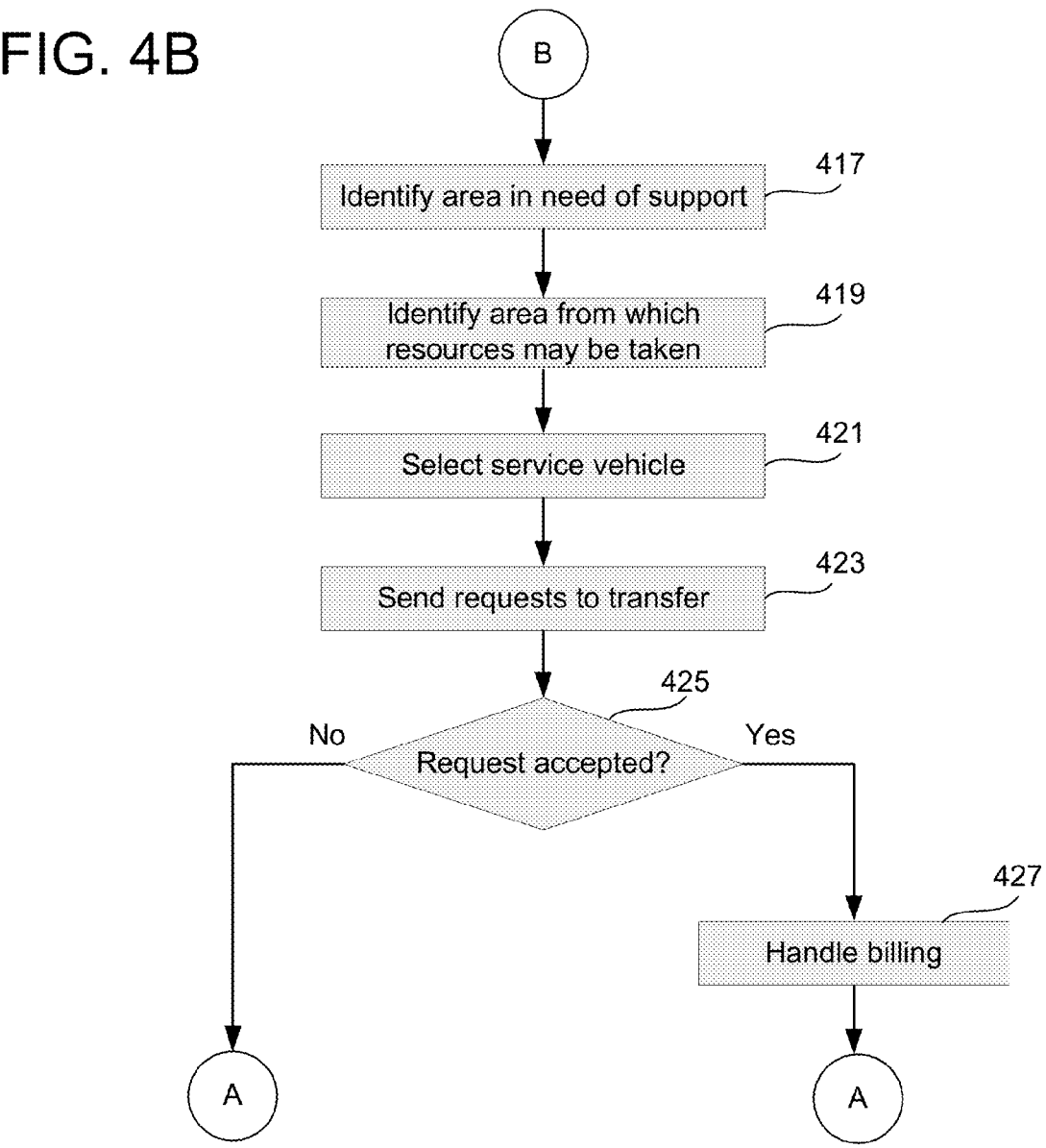

If the system at step 415 determines that reallocation of resources is to be performed, the subroutine of FIG. 4B may be executed. FIG. 4B illustrates example steps to perform a method of reallocating resources. In step 417, the system may identify an area within the service region that is most in need of additional support. For example, the system may determine which base station 220 is most under-equipped in comparison to its predicted needs and identify an area around that base station 220 as being the area most in need of additional support.

In step 419, the system may identify areas that would be within a tolerance of the promoted response time, if a service vehicle 303 were removed. For example, the system may determine that a base station 220 has five (5) tow trucks to serve its surrounding area within 15 minutes, and that the base station 220 would be able to serve its surrounding area within 17 minutes with four (4) tow trucks. If a 17 minute response time is within a tolerance (e.g., 5 minutes), then the system may determine that the base station 220 could be a source of additional support.

Although steps 417 and 419 are discussed separately from step 415, steps 417 and 419 may be performed within step 415 to make the determination of whether to reallocate resources. Steps 417 and 419, therefore, may simply include reading, from memory, the areas previously identified to make the determination in step 415.

In step 421, a service vehicle 303 may be selected from one of the areas identified in step 419. In step 423, a transfer request asking the selected service vehicle 303 to move to another base station 220 may be transmitted. Then, in step 425, the system may determine whether the transfer request was accepted by the selected service vehicle 303. If the transfer request is selected, the system may credit an account or otherwise make a payment to the accepting service vehicle 303 or its provider at step 427. After performing accounting in step 427, the system may return to step 415. Also, if the service vehicle 303 does not accept the transfer request (NO at step 425), the system may return to step 415 as well.

When the system returns to step 415, the system may again determine whether further reallocation should be performed. For example, if there are more areas in need and base stations 220 that can afford to part with their resources, then the system may perform reallocation again. However, if no more areas are in need or there are not surplus resources at any of the base stations, then the system may determine that no further reallocation is needed.

Steps 401-427 may be performed intermittently (e.g., periodically) throughout each day to monitor the status of the environment and resources. In some examples, steps 401-427 may be performed at (or soon after) the beginning of each time period in which there is a change in demand. For example, if a time period of 12 am-5:30 am is associated with a low level of demand and a time period of 5:30 am-7 am is associated with a high-medium level of demand, then at 5:30 am the system may perform steps 401-427 to evaluate resources, seek additional resources if needed, and reallocate resources if needed.

Figure 4C:
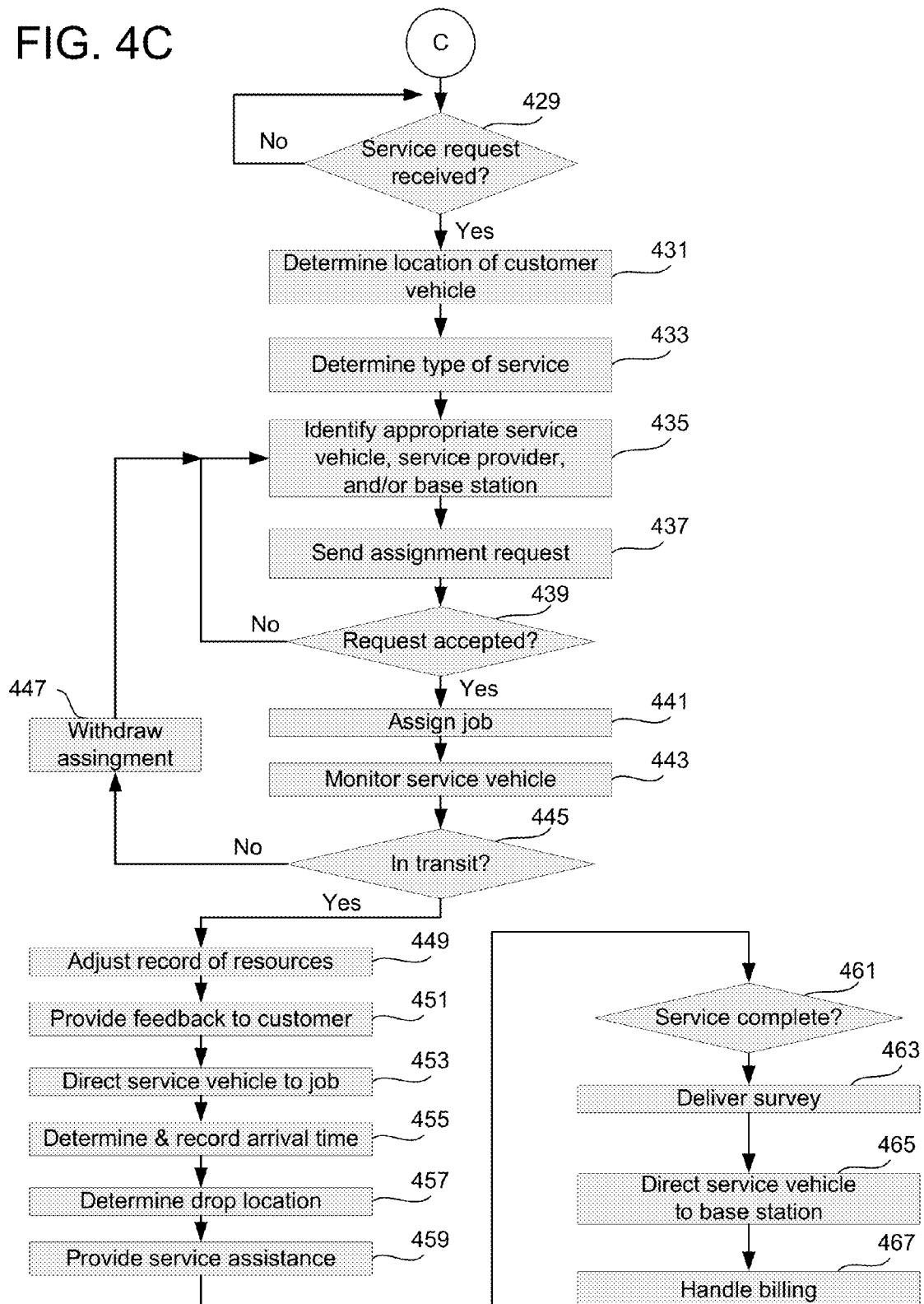

If no reallocation is to be performed or no further reallocation is to be performed (NO at step 415), the system may proceed to step 429 of FIG. 4C. Although step 429 is depicted as occurring after step 415 it should be understood that step 429 may be performed simultaneously with any of steps 401-427. The system may use multiple processors or multiple threads executed by one processor to perform such steps simultaneously.

In step 429, the system may determine whether a request for service has been received. When a customer vehicle 302 becomes disabled, the customer (e.g., driver or passenger of the customer vehicle 302) may want assistance. The customer may use his/her mobile computing device 100*m* or a vehicle computing device 100*v* to launch a roadside assistance management program or web browser to access a web page for submitting a service request. After launching the program or web browser, the customer may use the program or web page to generate and send a service request. The program or web page may be configured to deliver the service request to a predefined address. The service request may include various amounts of information. On one hand, the service request may include information indicating that roadside assistance is desired and location information of the computing device sending the request. On the other hand, the service request may include additional information providing further details, such as information indicating the reason for the roadside assistance (e.g., flat tire, engine problems, accident, etc.), information indicating whether towing is needed, information about the disabled customer vehicle 302, information about the scenario (e.g., number of vehicles involved if an accident, number of passengers in the customer vehicle 302, the customer vehicle 302 is in a ditch, etc.), information about user preferences (e.g., what service providers are desired), etc.

After the service request is generated, it may be transmitted via a wired or wireless connection (e.g., through a cellular network) to an application server 304 and/or administrative computing device 100*a*. The application servers 304 and/or administrative computing device 100*a* may be configured to monitor inputs to detect a service request. As shown in FIG. 4C, step 429 may be repeated until the service request is detected. If the service request is detected, the system may determine that a service request is received (YES at step 429) and may proceed to step 431.

In step 431, the roadside assistance management system (e.g., the application server 304) may determine the location of the customer vehicle 302. This determination may be made based on the location information (e.g., GPS coordinates) received with the service request. In step 433, the system (e.g., the application server 304) may also determine the type of service needed. For example, if the service request includes information that the customer vehicle 302 is experiencing engine problems, the system may determine that tow service is desired. Or, for example, if the service request includes information that the customer vehicle 302 has a flat tire, the system may determine that tire replacement or tire repair service is needed.

At step 435, the roadside assistance management system (e.g., the application server 304) may identify the appropriate service vehicle 303, service provider, and/or base station 220. The determination of step 435 may depend on the location and/or type of service determined in steps 431 and 433. In some cases, the system may determine a particular service vehicle 303 from among all available service vehicles 303. Each service vehicle 303 may be associated with a unique identifier. The roadside assistance management system may assign these identifiers to the service vehicles 303 in steps 401 or 403.

In some cases, instead of identifying a particular service vehicle 303, the system may identify a particular base station 220 from among all base stations 220. In particular, the system may identify the base station 220 that is closest to the location of the customer vehicle 220. Where there are multiple service vehicles 303 belonging to (e.g., owned or controlled by) multiple service providers at the same base station 220, the system may also identify a service provider to provide the service vehicle 303. Each base station may also be assigned a unique identifier, which may be assigned by the roadside assistance management system in steps 401 or 403.

The system may determine the particular service vehicle 303 by identifying the closest service vehicle 303 to the location of the customer vehicle 302 that is to be serviced (e.g., fixed and/or towed) or the service vehicle 303 that is expected to arrive at the job site the fastest. This may include determining the closest base station 220 to the customer vehicle 302 and then determining which service vehicles 303 are available at that base station 220. The system may compare GPS coordinates of the job site (e.g., location of the disabled vehicle 302) with GPS coordinates of the base stations 220 to identify the closest base station 220. The system may also use road and traffic information to determine expected arrival times to identify the service vehicle 303 that would reach the job site the fastest. Multiple travel routes for each available service vehicle 303 may be considered when determining such expected arrival times. In some embodiments, the determination at step 435 may include consideration of future availability. In other words, the determination may factor in the effects of assigning a serviceman and/or service vehicle 303 on the inventory/resources for meeting future demand. For example, if a van can be used to fulfill the service request, it may be sent (as long as the van can meet a response time goal) instead of a tow truck even though it is further from the job site than the tow truck so that the tow truck is available for a future service request where a tow may be needed.

In some embodiments, the system may first determine a set of service vehicles 303 that are capable of providing the type of service for the job. For example, the system may determine that a service van, as opposed to a tow truck, may be sufficiently equipped to provide the type of service desired (e.g., a flat tire), and therefore, may determine a set of service vans. Similarly, the system may determine which servicemen are available and appropriately skilled to provide the type of service desired. After determining the set of service vehicles 303 and/or servicemen, the system may select one that is expected to reach the location of the disabled customer vehicle 302 within a predetermined time. This predetermined time may be a promoted response time (e.g., 15 minutes) or another time that is less than the promoted response time to allow for a cushion.

The system may use one or more databases to select the appropriate service vehicle 303 and/or serviceman to respond to a service request. These databases may store profiles for the servicemen indicating which services they are trained and/or qualified to perform. These databases may also store profiles for the service vehicles 303 indicating the capabilities and/or equipment therein (e.g., flatbed, wheel lift, service weight (LD, MD, HD), dollies, winch, etc.). Further, the databases may be updated to store information that matches servicemen with service vehicles 303 for purposes of tracking inventory/resources and synchronizing mobile computing devices 100m with servicemen and/or service vehicles 303.

After identifying an appropriate service vehicle 303, or base station 220 from which a service vehicle 303 may be deployed, the system may send a request to assign (an assignment request) a service job in step 437. In some cases, the assignment request may be sent to the mobile computing device 100m or vehicle computing device 100v of the selected service vehicle 303. Alternatively, or additionally, the assignment request may be sent to the service provider computing device 100p associated with the selected service vehicle 303. The assignment request may include a query as to whether the selected service vehicle 303 or base station 220 is able and willing to provide service. In some embodiments, the assignment request may also include the location of the job site (e.g., the location of the disabled customer vehicle 302). The assignment request may also provide a time (e.g., a promoted time) that the service vehicle 303 has to provide service.

In step 439, the system may detect whether the assignment request was accepted. The assignment request may be accepted by the serviceman (e.g., tow truck driver) of the selected service vehicle 303 using a mobile computing device 100m or vehicle computing device 100v. Alternatively, the assignment request may be accepted by a service provider (e.g., dispatcher) using the service provider computing device 100p. If the assignment request is not accepted, the system may repeat step 435 to identify another service vehicle 303 or another base station 220.

If the assignment request is accepted, the job may be assigned to the service vehicle 303 at step 441. Where the assignment request is sent directly to the serviceman operating the service vehicle 303 and accepted by that serviceman, then assigning the job at step 441 may include recording the assignment of the job to the service vehicle 303 for record keeping. Meanwhile, where the assignment request is sent to a service provider computing device 100p and accepted by, for example, a dispatcher, then assigning the job at step 441 may include the dispatcher assigning the job to a particular service vehicle 303. For example, the dispatcher may use the service provider computing device 100p to transmit a job assignment to a mobile computing device 100m and/or a vehicle computing device 100v associated with a particular service vehicle 303. Also at step 441, such a dispatcher may also notify the administrative computing device 100a and/or application server 304 of the particular service vehicle 303 assigned to the job.

In step 443, the system may monitor the service vehicle assigned to the job. For example, the application server 403 may track movement of the service vehicle 303 assigned to the job. Once a service vehicle 303 is assigned to a job, a mobile computing device 100m and/or a vehicle computing device 100v associated with the service vehicle 303 may begin sending location information to an application server 304, administrative computing device 100a, or service provider computing device 100p so the system may track the movement of the service vehicle 303.

In step 445, the roadside assistance management system may determine whether the selected and assigned service vehicle 303 is in transit to the job. For example, the system may analyze the location information sent by the mobile computing device 100m and/or vehicle computing device 100v associated with the service vehicle to detect whether the service vehicle is moving, and therefore, on target to meet the promised response time. If the service vehicle 303 does not move by a certain time after being assigned the job, the system may determine that the service vehicle 303 is unlikely to meet the target response time. For example, if a driver is slow to get the service vehicle 303 moving, the system may determine that the service vehicle 303 is not in transit (NO at step 445). The system may determine whether the service vehicle is moving based on data collected by, e.g., an accelerometer or GPS of the mobile computing device 100*m* and/or vehicle computing device 100*v* associated with the service vehicle 303.

If the service vehicle 303 does not move in time (NO at step 445), the system may withdraw the assignment of the service vehicle 303 to the job at step 447 and return to step 435 to identify another service vehicle 303. If the service vehicle 303 is in transit (YES at step 445), the system may adjust its records to reflect the change in resources at step 449. For example, the system may adjust its records to reflect that the base station 220 from which the selected service vehicle 303 is deployed has one less available service vehicle 303.

In step 451, the roadside assistance management system may provide feedback to the customer. For example, the administrative computing device 100*a* and/or application server 304 may transmit information to the customer's mobile computing device 100*m* or the customer's vehicle computing device 100*v* informing the customer that the service vehicle 303 is on its way. In some embodiments, the system may provide the customer with an estimated arrival time that the service vehicle 303 will arrive at the job site. Also, in some embodiments, the system may provide a map and information showing the service vehicle's progress on its trip to the job site.

In step 453, the roadside assistance management system may provide directions to the service vehicle 303. For example, an application server 304 may transmit driving directions to the mobile computing device 100*m* and/or vehicle computing device 100*v* associated with the selected service vehicle 303. The driving directions may be driving directions from the selected service vehicle's base station 220 to the job site. In some embodiments, the system may send the GPS coordinates of the job site, and the mobile computing device 100*m* and/or vehicle computing device associated with the service vehicle 303 may use its own GPS to determine the driving directions to the job site. Also, the system may send updated directions if traffic or other environmental conditions might cause the service vehicle 303 to be delayed. For example, the system may instruct the service vehicle 303 to take a different route to reach the job site due to a traffic jam.

In step 455, the system may detect when the service vehicle 303 reaches the job site. For example, the application server 304 may determine that the location information received from a mobile computing device 100*m* or vehicle computing device 100*v* corresponding to the service vehicle 303 matches the location information of the job site. When the system detects that the service vehicle 303 has arrived at the job site, the system may record the arrival time.

In step 457, if the disabled customer vehicle 302 is to be towed, the system may determine a drop location (i.e., a destination where the customer vehicle 302 is to be dropped off). The system may poll the customer to determine the drop location or check user preferences to determine a drop location. For example, the application server 304 may query the customer's mobile computing device 100*m* to provide a drop location. In some embodiments, the system may poll the customer while the customer is waiting for the service vehicle 303 to arrive, and thus, step 457 may be performed prior to step 455. Also, in some embodiments, the system may recommend drop locations. For example, the system may determine mechanics or other vehicle repair shops located near the job site, near the customer's home, or on the way from the job site to the customer's home, and recommend them to the customer. Upon determining the drop location, the system may provide the service vehicle 303 with directions to the drop location at step 457.

In step 459, the system may provide the serviceman with assistance. In other words, the system may provide information that may help the serviceman troubleshoot a problem with the disabled customer vehicle 302. For example, the system may provide the serviceman with information for fixing a flat tire or engine that is specific to the make and model of the disabled customer vehicle 302.

In step 461, the system may determine whether the service is complete. This determination may be made by polling the serviceman operating the service vehicle 303 that was deployed to provide service. For example, the application server 304 may send a query to the serviceman's mobile computing device 100*m* or the vehicle computing device 100*v* of the service vehicle 303. Alternatively, the serviceman may be responsible for notifying the system when the service is complete. In some embodiments, the system may track the service vehicle 303 and determine that the service is complete when the service vehicle 303 arrives at a drop location.

After the service is complete, the system may generate and send a survey to the customer to obtain feedback at step 463. For example, the application server 304 or administrative computing device 100*a* may send a survey to the mobile computing device 100*m* of the customer to ask the customer about his/her experience with the service.

Also, after the service is complete, the system may direct the service vehicle 303 to a base station 220 at step 465. In some cases, the system may direct the service vehicle 303 back to the base station 220 where it was previously stationed. In other cases, the system may direct the service vehicle 303 to another service station that might be closer to the service vehicle 303, that might be within a shorter driving distance of the service vehicle 303, or that might be in desire of additional support. For example, the service vehicle 303 may be closer to a different base station 220 than the one it left to go to the job after it drops off the customer vehicle 302, and therefore, may be directed to the closer base station 220 rather than back to the base station 220 it left. Directing the service vehicle to a base station 220 may include providing directions to the base station and/or providing an address of the base station. In some cases, the system may provide directions that route the service vehicle 303 through an area where there is likely to be another job. For example, the system may provide the service vehicle 303 with a route that takes the service vehicle 303 near a hot spot, where accidents are common, so that the service vehicle 303 may be more likely to quickly respond to another service request.

In step 467, the system may credit an account or otherwise record the completed service so that payment may be made to the service vehicle 303 or service provider that performed the service. It should be understood that the organization operating the system may contract or otherwise enlist one or more separate service providers (e.g., tow truck companies) to actually perform the service, and therefore, the system may include a billing component to ensure that the proper service providers are being paid.

FIGS. 5-8 illustrate various user interfaces generated by the roadside assistance management system. These user interfaces may be displayed at various times throughout the process of providing roadside assistance. Further, the user interfaces of FIGS. 5-8 are designed to illustrate various features and aspects of the user interfaces and the system, and do not limit the visual appearance or layout of the user interfaces.

FIG. 5 illustrates a user interface 500 for allowing a customer (e.g., a driver or passenger) to submit a service request. The user interface 500 may be presented on any display connected to a customer's mobile computing device 100*m* (e.g., a screen on a smartphone) and/or the vehicle computing device 100*v* of the customer vehicle 302 (e.g., a screen on the dashboard). When a customer vehicle 302 becomes disabled (e.g., breaks down due to mechanical failure or an accident), a driver or passenger of the customer vehicle 302 may operate their mobile computing device 100*m* or a vehicle computing device 100*v* within the customer vehicle 302 to access the user interface 500. For example, the customer may launch the roadside assistance management program on his/her smartphone to view the user interface 500.

As shown in FIG. 5, the user interface 500 may be configured to accept several user selections to generate a customized service request. Specifically, the user interface 500 shows three steps for acquiring three different types of information. Fewer or more steps may be implemented in different embodiments. In a first step, the customer may enter information about the disabled customer vehicle 302. For example, the customer may provide the make and model of the vehicle. In some cases, this information may be used to determine the appropriate serviceman and/or service vehicle 303 for the job. In some embodiments, the customer may have previously stored the information about their vehicles so that they can simply select which of their vehicles is disabled. For example, as shown in FIG. 5, if the customer owns a Ford Explorer and Chevy Camaro, the customer may select that the Chevy Camaro is the vehicle for which the customer is requesting service. In some embodiments, this information may be collected from customers in advance and stored in association with a user profile of the customer. In some embodiments, this information may be automatically obtained from, for example, insurance company records associating customers and their vehicles. As such, the roadside assistance management program executing on the customer's mobile computing device 100*m* may pre-fill certain fields, like vehicle information fields, with based on information acquired from an insurance company database.

FIG. 5 also shows a second step in which the customer may designate a type of problem the disabled customer vehicle 302 is experiencing. In some embodiments, as shown in FIG. 5, the user interface 500 may provide a listing of some possible issues. Further, in some embodiments, data from vehicle sensors may be evaluated to select certain issues. For example, if the vehicle computing device 100*v* of the customer vehicle 302 detects a flat tire based on tire pressure sensors, the vehicle computing device 100*v* may import this information into the roadside assistance management program so the program automatically selects a flat tire option in the second step of the user interface 500. Using the information collected in the second step, the system may later determine the type of service requested. This information may also be helpful in determining the appropriate serviceman and/or service vehicle 303 to dispatch to the job.

In the third step of FIG. 5, the user interface 500 may provide a field for the customer to enter comments. For example, the customer may enter that they were involved in an accident, that their customer vehicle 302 needs to be towed, that they would like a rental car, that they would like a taxi to take them home, etc. After completing one or more steps to enter information, the customer may choose to submit the service request. Upon selecting to submit the request, the roadside assistance management program may generate and send a service request with the entered information to the system (e.g., to the administrative computing device 100*a* and/or the application server 304).

Although the user interface 500 allows for customizing a service request, in some embodiments, the customer may quickly send a general service request with the click of a single key. Also, while user interface 500 shows three steps on a single screen, each step may be on its own screen and the customer may navigate back and forward through the screens. Moreover, additional screens may be used to collect additional data for generating the service request.

FIG. 6 illustrates another user interface 600 in accordance with aspects of the disclosure. The user interface 600 may provide a tool for handling the service requests once they are submitted. In particular, the user interface 600 may be accessed by an administrator or other personnel of the organization managing the system. The user interface 600 may be generated by the administrative computing device 100*a* and/or application server 304 and displayed on a display device thereof. In some embodiments, an administrator or other personnel may monitor service requests and use the user interface 600 to communicate with customers, service vehicles 303 (e.g., servicemen), and service providers (e.g., dispatchers of different tow truck companies). For example, an administrator using the administrative computing device 100 may view and interact with the user interface 600 to participate in a live chat with the customer to keep the customer informed of the status of his/her service request. The administrator may also view and interact with the user interface 600 to participate in a live chat with a serviceman (e.g., driver or passenger) of a service vehicle 303 to provide the serviceman with assistance and/or to obtain a status of the service vehicle 303 (e.g., why the service vehicle 303 is taking so long, whether the service vehicle 303 is stuck in traffic, etc.)

Figure 7:
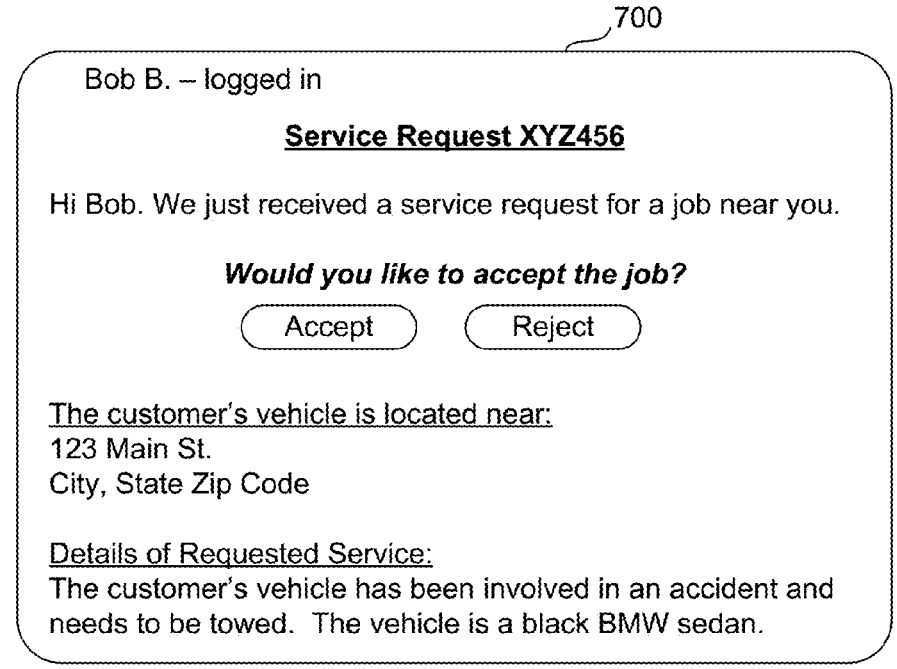

FIG. 7 illustrates another user interface 700 in accordance with aspects of the disclosure. The user interface 700 may provide an interface for a serviceman (e.g., tow truck driver) associated with a service vehicle 303. In the example of FIG. 7, the user interface 700 illustrates a screen displayed on a serviceman's mobile computing device 100*m*, a vehicle computing device 100*v* of a service vehicle 303, and/or a service provider computing device 100*p* operated by a service provider's dispatcher (e.g., a tow truck company dispatcher) when a service request is received. As explained herein, when a service request is received, the application server 304 or administrative computing device 100*a* may select a particular service vehicle 303, base station 220, and/or service provider desired to perform the job. The application server 304 or administrative computing device 100*a* may generate and send information causing the user interface 700 to be displayed so the selected service vehicle 303, base station 220, and/or service provider may accept or reject the job. As shown in FIG. 7, the user interface 700 may provide details about the job, such as the location of the job (e.g., where the disabled customer vehicle 302 is located), information about the disabled vehicle, and/or the type of service required. In some examples, the user interface 700 may also display a clock with the amount of time remaining before the target response time is reached or other information regarding the response time. Also, in some examples, the user interface 700 may display an amount of money offered to the service provider (e.g., the tow truck company) for completing the service. If the service request is accepted, the corresponding job may be assigned to the accepting entity (e.g., the particular service vehicle 303 used to perform the job). If the service request is rejected, the system may identify another suitable service vehicle 303, base station 220, and/or service provider to take the job. If no response is received after a certain period of time, the system may treat the lack of response as a rejection and also identify another suitable service vehicle 303, base station 220, and/or service provider.

Figure 8:
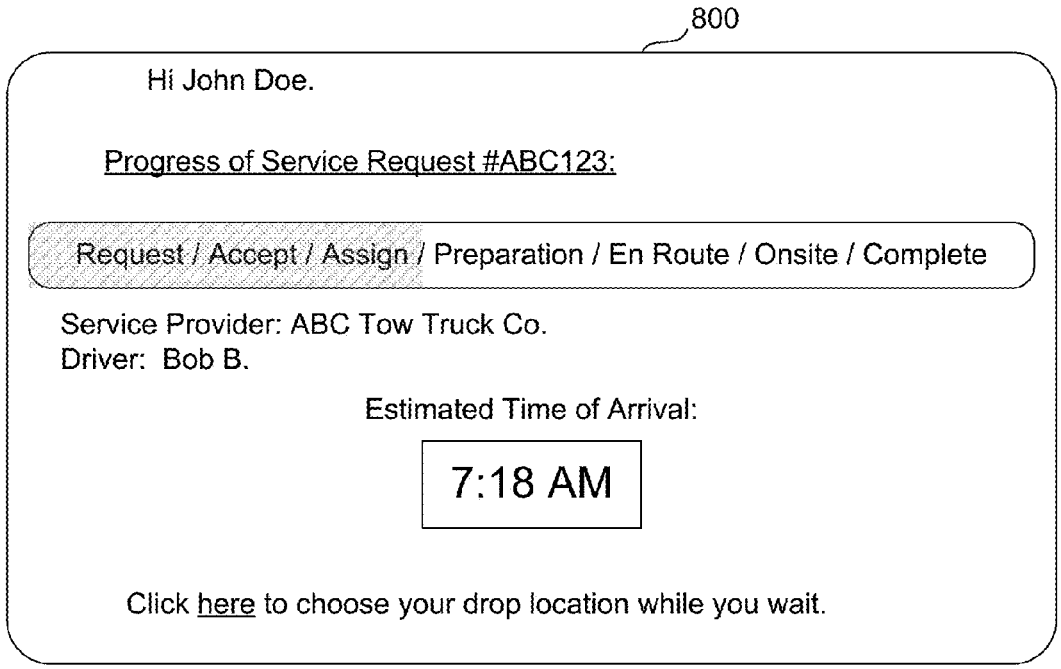

FIG. 8 illustrates yet another user interface 800 in accordance with aspects of the disclosure. Specifically, FIG. 8 illustrates a user interface 800 that provides feedback to a customer. As shown in FIG. 8, the user interface 800 may depict which stage a service request is in. In the example of FIG. 8, the user interface 800 illustrates that the service request has been assigned to a service vehicle 303 or serviceman and is in the preparation stage, during which the service vehicle 303 is being prepared (e.g., equipped, turned on, etc.) and the system is monitoring to see when the service vehicle 303 begins its trip to the disabled vehicle. As the system detects completion of each stage, the user interface 800 may be updated. For example, a spectrum showing the different stages may be shaded or otherwise modified to illustrate the progress up until the time at which the service is completed (e.g., the customer vehicle 302 is towed to its drop off location). The stages shown in FIG. 8 are examples, and fewer or more stages may be used.

FIG. 8 also shows that the user interface 800 may provide the name of the service provider (e.g., a tow truck company) and name (and/or a picture) of the serviceman (e.g., tow truck driver). In addition, the user interface 800 may include the estimated time of arrival. Thus, customers can readily see whether the service is being provided within the time period promised. The user interface 800 may also be configured to include links or fields for acquiring additional information while the customer waits for the service vehicle 303 to arrive. For example, the user interface 800 may also show the name of a taxi cab company that was dispatched to pick up the customer and/or an estimated time of arrival of a taxi cab (e.g., in embodiments where a taxi cab is promised within a predetermined time, such as 15 minutes).

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
  receiving information indicating a plurality of service vehicles and a plurality of base stations, wherein each service vehicle of the plurality of service vehicles is assigned to a base station of the plurality of base stations;
  determining inserted by a computing device, a level of demand for the plurality of service vehicles;
  determining inserted by a computing device, a response time for a first base station of the plurality of base stations, wherein the response time corresponds to an estimated amount of time for a service vehicle assigned to the first base station to respond to a service request;
  determining, inserted by a computing device, based on the level of demand and the response time, to increase a number of service vehicles at the first base station; and
  reassigning a service vehicle of the plurality of service vehicles from a second base station of the plurality of base stations to the first base station.

2. The method of claim 1, wherein determining the level of demand comprises determining the level of demand based on a time of day.

3. The method of claim 1, wherein determining to increase the number of service vehicles at the first base station comprises determining that the response time is above a predetermined response time.

4. The method of claim 1, wherein reassigning the service vehicle from the second base station to the first base station comprises determining a response time of the second base station.

5. The method of claim 1, wherein reassigning the service vehicle from the second base station to the first base station comprises determining that a response time of the second base station is below a threshold response time.

6. The method of claim 1, wherein reassigning the service vehicle from the second base station to the first base station comprises:
  transmitting a request to a second computing device corresponding to the service vehicle; and
  receiving an indication that the request was accepted.

7. The method of claim 1, wherein the service request corresponds to a request for service within a geographical area associated with the first base station.

8. A system comprising:
  a plurality of first computing devices associated with a plurality of first service vehicles; and
  a second computing device configured to:
    receive information indicating a plurality of base stations, wherein each service vehicle of the plurality of first service vehicles is assigned to a base station of the plurality of base stations;
    determine a level of demand for the plurality of first service vehicles;
    determine a response time for a first base station of the plurality of base stations, wherein the response time corresponds to an estimated amount of time for a service vehicle assigned to the first base station to respond to a service request;
    determine, based on the level of demand and the response time, to assign one or more additional service vehicles to the first base station; and
    sending, to a third computing device associated with a second service vehicle, a request for the second service vehicle to be assigned to the first base station, wherein the second service vehicle is not assigned to a base station of the plurality of base stations.

9. The system of claim 8, wherein the service request corresponds to a request for service within a geographical area associated with the first base station.

10. The system of claim 8, wherein determining the level of demand comprises determining the level of demand based on a time of day.

11. The system of claim 8, wherein the second computing device is further configured to:
  receive an indication that the request for the second service vehicle to be assigned to the first base station was not accepted; and
  in response to the indication, reassign a third vehicle of the plurality of first service vehicles from a second base station of the plurality of base stations to the first base station.

12. The system of claim 8, wherein the second computing device is further configured to:
  receive an indication that the request for the second service vehicle to be assigned to the first base station was not accepted; and in response to the indication, send, to a fourth computing device associated with a third service vehicle, a request for the third service vehicle to be assigned to the first base station, wherein the third service vehicle is not assigned to a base station of the plurality of base stations.

13. The system of claim 8, wherein determining the response time comprises determining the response time based at least in part on traffic conditions or weather conditions.

14. The system of claim 8, wherein sending the request for the second service vehicle to be assigned to the first base station comprises broadcasting the request to a plurality of service providers.

15. A method comprising:
    displaying, by a first computing device, a first user interface comprising a request for an indicator of a vehicle and a request for a description of a service request;
    receiving, via the first user interface, user input comprising the indicator of the vehicle and the description of the service request;
    transmitting, to a second computing device, the indicator of the vehicle and the description of the service request;
    receiving, by the first computing device, data indicating a status of the service request; and
    displaying a second user interface indicating the status of the service request.

16. The method of claim 15, further comprising:
    receiving data indicating an updated status of the service request; and
    modifying the second user interface to indicate the updated status of the service request.

17. The method of claim 15, wherein the second user interface indicates an estimated time of arrival of a service vehicle associated with the service request.

18. The method of claim 15, further comprising receiving data from one or more vehicle sensors of the vehicle, and wherein the first user interface comprises one or more service requests that may be selected, wherein the one or more service requests are determined based on the data from the one or more vehicle sensors.

19. The method of claim 15, wherein the second user interface indicates a location of a service vehicle associated with the service request.

20. The method of claim 15, wherein the second user interface indicates a service provider that is responding to the service request.

* * * * *

UNITED STATES PATENT AND TRADEMARK OFFICE
CERTIFICATE OF CORRECTION

PATENT NO. : 9,691,045 B1
APPLICATION NO. : 15/010182
DATED : June 27, 2017
INVENTOR(S) : Ryan M. Briggs et al.

Page 1 of 1

It is certified that error appears in the above-identified patent and that said Letters Patent is hereby corrected as shown below:

In Column 25, Claim 1, Line 55:
Please delete "determining inserted by a computing device" and insert -- determining, by a computing device, --.

In Column 25, Claim 1, Line 57:
Please delete "determining inserted by a computing device" and insert -- determining, by the computing device, --.

In Column 25, Claim 1, Line 62:
Please delete "determining inserted by a computing device" and insert -- determining, by the computing device, and --.

Signed and Sealed this
Seventeenth Day of April, 2018

Andrei Iancu
*Director of the United States Patent and Trademark Office*